March 11, 1930.   A. W. MORTON   1,749,831
PISTON RING
Filed May 14, 1928
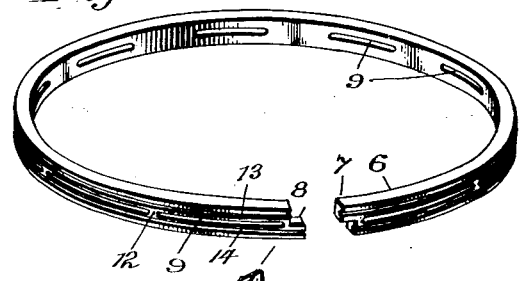
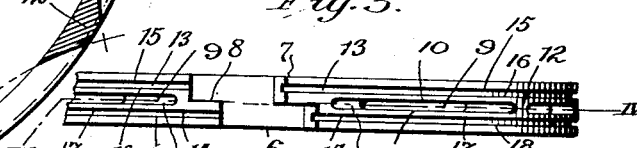
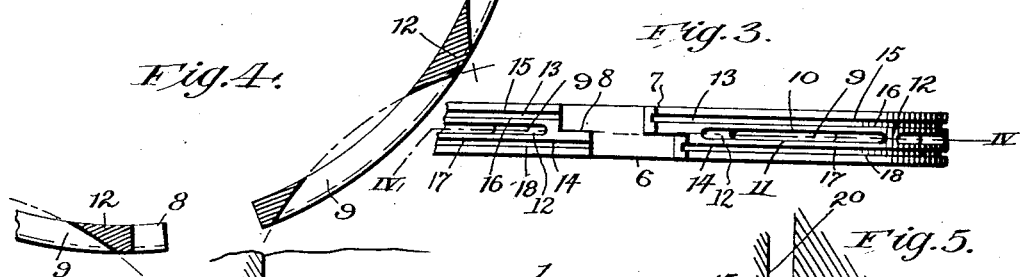
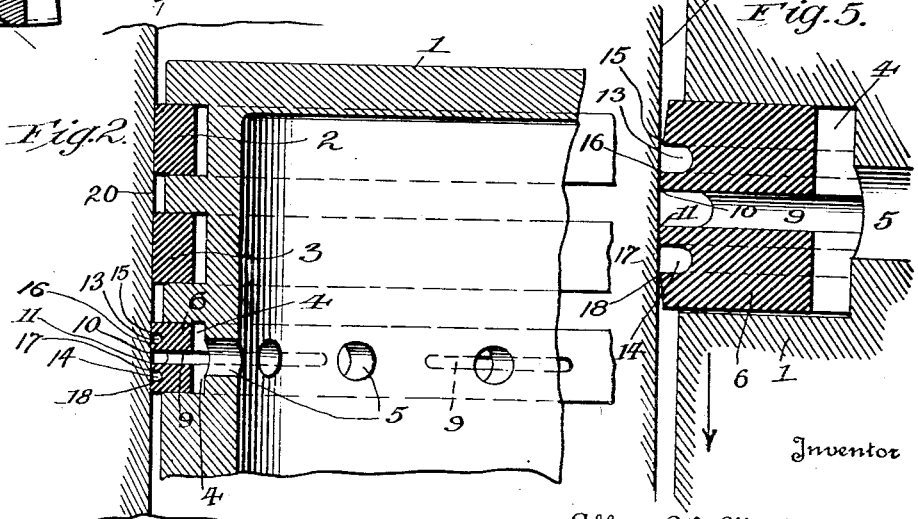
Inventor
Allen W. Morton
By Dodge and Sons
Attorney Patented Mar. 11, 1930

1,749,831

UNITED STATES PATENT OFFICE

ALLEN W. MORTON, OF BALTIMORE, MARYLAND, ASSIGNOR TO THE AMERICAN HAMMERED PISTON RING COMPANY, OF BALTIMORE, MARYLAND, A CORPORATION OF MARYLAND

PISTON RING

Application filed May 14, 1928. Serial No. 277,672.

This invention pertains to piston rings and more particularly to that type of ring commonly designated in the art as an "oil ring".

The structure is shown in the annexed drawings wherein,

Figure 1 is a perspective view of a ring embodying my invention,

Figure 2 a vertical sectional view showing a portion of a piston with the oil ring in place, Figure 3 a fragmentary view of a portion of the ring as seen in side elevation, Figure 4 a horizontal section taken on the line IV—IV of Figure 3 and illustrating more particularly the drainage slots formed in the ring, and Figure 5 a sectional view more or less diagrammatic showing the ring in cross section and the position that one particular portion of the ring and the piston may assume with reference to the cylinder wall on an outward stroke of the piston, it being understood that an opposite condition or position of the parts would obtain at a diametrically opposite point.

The main object of the present invention is to produce a piston ring which will prevent undue leakage of oil past the piston and at the same time insure sufficient lubrication of the wall of the cylinder over which the ring travels.

A further object of the invention is to provide a structure wherein surplus oil is removed from the cylinder wall by the ring and transmitted or allowed to flow back to the sump of the engine while at the same time oil in a moderate quantity is fed to the wall of the cylinder.

In the drawings 1 denotes a typical piston provided with the usual packing rings 2 and 3 in the upper portion thereof. Below the same there is provided another groove as 4 through the rear wall of which there is formed a series of openings as 5 leading to the interior of the piston.

Mounted within the groove 4 is the oil ring of my invention designated generally by 6. Said ring, as will be seen upon reference to the various views, is a single piece ring having reduced end sections 7 and 8 adapted, when the ring is positioned, to overlap as is common in ring construction.

Extending through the body of the ring at right angles to the axis thereof is a series of slots or openings 9, the openings being wider at the forward or outer face of the ring than at the inner portion thereof.

The slots 9 produce upon the periphery of the ring scraping edges 10 and 11 which extend around the ring and which edges are, of course, interrupted by the wall or body sections 12 which lie intermediate the adjacent ends of the slots 9.

Formed in the peripheral or outer face of the ring are two grooves or channels 13 and 14, said grooves lying in parallelism to each other and to the slots or openings 9. The grooves are continuous and extend entirely around the ring.

Groove 13 provides in effect two scraping edges 15 and 16 and the lower groove 14 also provides two scraping edges 17 and 18. The upper and lower edges of the ring also provide scraping edges as is common in all ring structures of the general type of that shown herein.

It is designed to place the ring thus formed in the lower groove of the piston, as indicated in Figure 2, in which position it tends to prevent any excess of oil from being carried to and past the upper rings 2 and 3.

I have found in the actual use of the ring as herein set forth and described that it is highly efficient as an oil scraping ring and at the same time insures proper lubrication of the inner wall of the cylinder.

It is to be noted that the grooves 13 and 14 are continuous, or in other words extend entirely around the ring and are not connected with the drainage slots or openings 9.

Pistons of internal combustion engines tend to rock or tilt to a slight extent as they move up and down in their cylinders and this rocking or tilting is imparted to the rings and the rings in and of themselves seemingly have a slight tilting action with reference to the piston and the grooves in which they are seated. This fact may be verified by placing a ring having a perfectly flat cylinder contacting face in an engine and operating the same for a period, then removing the ring and testing its outer bearing face with a straight-edge or other mechanical testing device. It will be found that the outer bearing face is slightly convex or rounded, this being due to the rocking or tilting motion of the piston and the ring or the tilting of the ring in and of itself.

In Figure 5 I have shown on a somewhat enlarged scale a piston having an oil ring of the present invention mounted therein. The piston is supposed to be moving in the direction of the arrow and is tilted slightly to the right at the upper end with reference to the cylinder wall, which latter is denoted by 20. With the ring of the type heretofore described, and assuming that the ring has been worn or rounded as shown in Figure 5, it will be seen that the scraping edges 17 and 10 throughout that portion of the ring shown are effective to remove surplus oil and that any oil which may have been gathered in the upper groove 13 will be fed outwardly therefrom against the cylinder wall 20.

The advancing or lower outer edge of the ring will tend to act as a scraper, or at least will act to cut off the crest of the oil wave which tends to well up in front of the advancing ring and such oil may pass inwardly beneath the ring to the drainage openings 5 or be carried downwardly by the ring.

Any excess of oil which passes the lower edge of the ring passes into the groove 14 thence in part to the drainage openings 9 directly thereabove and thence into the ring groove 4 and finally to the interior of the piston through the drainage openings 5.

When the piston moves upwardly it will be tipped or tilted in the opposite direction and the ring will likewise be tilted so that the edge 15 more closely approaches the cylinder wall 20 and the edge 18 moves away an equal amount.

It will be appreciated, of course, that the diametrically opposite side of the piston ring, when the piston is tilted in the position shown in Figure 5, will assume an opposite condition or position from that shown in the drawing. It will be understood, of course, that the piston does not always tilt in the same direction but the direction of tilting will or may vary during the operation of the engine.

From the foregoing it will be seen that the drainage openings and the grooves cooperate to effectively handle the oil situation within the cylinder. Not only do the edges of the grooves 14 and 15 present dual scraping edges but the edges of the slots and the outer edges of the rings likewise present scraping edges. In other words, there is a multiplicity of scraping edges present, which edges tend to spread the oil uniformly around and over the cylinder wall and hence the ring maintains a uniform but very thin film of oil at all times.

In starting with a cold motor there is also an advantage of having oil in the annular grooves 14 and 15 for immediate lubrication of the cylinder wall when the motor is turned over. The presence of the plurality of scraping edges to each side of the centrally positioned drainage openings or slots in the ring tend to collect the oil and deliver it to the drainage openings or slots where such excess collected oil passes inwardly of the ring to the interior of the piston and thence to the sump.

What is claimed is:

1. As a new article of manufacture a piston ring having oil drainage openings extending therethrough from its outer to its inner face and a pair of grooves extending circumferentially of the ring, one groove to each side of the drainage openings and free of connection therewith, and inward of the respective side faces of the ring, the outer marginal corners of said openings and grooves forming scraping edges.

2. As a new article of manufacture a piston ring having a plurality of extended drainage openings passing therethrough from its outer to its inner face the outer margins of said openings forming scraping edges, and a continuous, uninterrupted circumferentially extending groove located to each side of said drainage openings, each of said grooves standing in spaced relation to the drainage openings and to the adjacent side face of the ring, the margins of each of said grooves likewise forming scraping edges.

3. As a new article of manufacture a piston ring having a series of elongated slots extending therethrough from its outer to its inner face said slots being centrally disposed between the upper and lower faces of the ring and a pair of grooves extending circumferentially of the ring, one to each side of the slots the margins of said grooves presenting scraping edges independent of the scraping edges formed by the outer corners of the ring, and said grooves being free of any intercommunication with the slots.

4. As a new article of manufacture a piston ring rectangular in cross section and presenting at the upper and lower outer margins of the upper and lower faces scraping edges said ring likewise having a series of elongated slots extending centrally therethrough from the outer to the inner face thereof, and a pair of continuous grooves formed in the outer face of the ring, said grooves extending entirely around the ring and lying to opposite sides of the slots and in spaced relation thereto and inward of the upper and lower faces of the ring.

5. In combination with a piston having a ring-receiving groove formed therein with openings extending from the base of the groove inwardly through the wall of the piston and a ring mounted in said groove said ring having a series of oil drainage openings extending transversely thereof from its outer to its inner face, and a pair of grooves extending circumferentially of the outer face of the ring said grooves standing in spaced relation to each other, one to each side of the drainage openings aforesaid, and inward of the upper and lower faces of the ring, said grooves being free of any intercommunication with the drainage openings.

6. A piston ring presenting an outer convex face, said ring having oil drainage openings passing therethrough from its outer to its inner face, the outer margins of said openings forming scraping edges, and said ring likewise having a pair of grooves extending circumferentially of the ring, one to each side of the drainage openings, the margins of said grooves presenting scraping edges independent of those formed by the edges of the ring and the drainage openings and said grooves being free of any intercommunication with the oil drainage openings.

In testimony whereof I have signed my name to this specification.

ALLEN W. MORTON.